United States Patent
Zaslavsky et al.

(10) Patent No.: US 10,505,963 B1
(45) Date of Patent: Dec. 10, 2019

(54) ANOMALY SCORE GENERATION BASED ON ADAPTIVE CLUSTERING OF USER LOCATION

(71) Applicant: EMC IP Holding Company LLC, Hopkinton, MA (US)

(72) Inventors: Alex Zaslavsky, Brookline, MA (US); Liron Liptz, Herzelia (IL); Shay Amram, Holon (IL); Kevin Bowers, Melrose, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 67 days.

(21) Appl. No.: 15/800,506

(22) Filed: Nov. 1, 2017

(51) Int. Cl.
*H04L 29/06* (2006.01)
*G06F 16/29* (2019.01)
*G06F 16/23* (2019.01)

(52) U.S. Cl.
CPC ...... *H04L 63/1425* (2013.01); *G06F 16/2365* (2019.01); *G06F 16/2379* (2019.01); *G06F 16/29* (2019.01); *H04L 63/08* (2013.01)

(58) Field of Classification Search
CPC ......... H04L 63/20; H04L 67/42; H04L 63/10; H04L 63/1425; H04L 63/08; G06F 16/29; G06F 16/2379; G06F 16/2365
See application file for complete search history.

(56) References Cited

U.S. PATENT DOCUMENTS

| 2010/0057773 | A1* | 3/2010 | Hore | G06K 9/6221 |
| | | | | 707/E17.046 |
| 2014/0180767 | A1* | 6/2014 | Villars | G06Q 30/0205 |
| | | | | 705/7.34 |
| 2015/0058982 | A1* | 2/2015 | Eskin | G06F 16/84 |
| | | | | 726/23 |
| 2015/0379537 | A1* | 12/2015 | Ghosh | G06F 16/29 |
| | | | | 705/7.34 |

(Continued)

OTHER PUBLICATIONS

Wikipedia, Geohash, https://en.wikipedia.org/w/index.php?title=Geohash&oldid=807962609, Oct. 31, 2017.

*Primary Examiner* — Michael R Vaughan
(74) *Attorney, Agent, or Firm* — Ryan, Mason & Lewis, LLP (57) ABSTRACT

Techniques are provided for determining anomaly scores for transactions based on adaptive clustering of the location of a given user over multiple transactions. In one embodiment, a method comprises obtaining transaction data for a given computer transaction by a user; extracting one or more location features from the transaction data for the given computer transaction; determining a user location of the given computer transaction based on the one or more location features; assigning the given computer transaction to one user location cluster of a plurality of user location clusters of the user based on a distance between the user location and centroids of each of the plurality of user location clusters, when the determined user location satisfies one or more predefined distance criteria; determining an (Continued)

anomaly score for the given computer transaction based at least in part on a centroid location of the assigned user location cluster; and updating the centroid location of the assigned user location cluster based on the user location.

20 Claims, 6 Drawing Sheets

(56) References Cited

U.S. PATENT DOCUMENTS

| | | | |
|---|---|---|---|
| 2016/0379388 A1* | 12/2016 | Rasco | G06F 16/29 |
| | | | 715/753 |
| 2017/0230418 A1* | 8/2017 | Amar | H04L 67/22 |
| 2019/0005502 A1* | 1/2019 | Kumar | G06Q 20/4016 |
| 2019/0132224 A1* | 5/2019 | Verma | H04L 47/2441 |

* cited by examiner

```
*** Convert from Degrees Lat/Lon to Radians
 1: latitude_rad = lat2 * PI / 180;
 2: longitude_rad = lon2 * PI / 180;
*** Convert to Decimal and Calculate Distance
 3: x_point = Cos(latitude_rad) * Cos(longitude_rad);
 4: y_point = Cos(latitude_rad) * Sin(longitude_rad);
 5: z_point = Sin(latitude_rad);
 6: x_center = Cos(center_lat_rad) * Cos(center_lon_rad);
 7: y_center = Cos(center_lat_rad) * Sin(center_lon_rad);
 8: z_center = Sin(center_lat_rad);
 9: total = num_points_in_cluster;
10: x = (x_center * total + x_point) / (total + 1);
11: y = (y_center * total + y_point) / (total + 1);
12: z = (z_center * total + z_point) / (total + 1);
*** Convert from Decimal Lat/Lon to Radians
13: centralLongitude = Math.Atan2(y, x);
14: centralSquareRoot = Math.Sqrt(x * x + y * y);
15: centralLatitude = Math.Atan2(z, centralSquareRoot);
*** Convert from Radians Lat/Lon to Degrees:
16: centralLatitude * 180 / Math.PI, centralLongitude * 180 / Math.PI
```

ANOMALY SCORE GENERATION BASED ON ADAPTIVE CLUSTERING OF USER LOCATION

FIELD

The field relates generally to information processing systems, and more particularly to the determination of location information with respect to computer transactions.

BACKGROUND

Fraud detection and Entity and User Behavior Analytics (EUBA) systems often use the location (e.g., country, city, or global positioning system (GPS) coordinates) of an entity (e.g., a user or an IP (Internet Protocol) address) as a factor in determining the risk associated with an attempt to access a protected resource. When the location information is collected by a GPS, the collected location information may be very noisy due to the high resolution (within several meters), which could might be a challenge for EUBA systems and other identity assurance systems.

SUMMARY

Illustrative embodiments provide techniques for determining anomaly scores for transactions based on adaptive clustering of the location of a given user over multiple transactions. In one embodiment, a method comprises obtaining transaction data for a given computer transaction by a user; extracting one or more location features from the transaction data for the given computer transaction; determining a user location of the given computer transaction based on the one or more location features; assigning the given computer transaction to one user location cluster of a plurality of user location clusters of the user based on a distance between the user location and centroids of each of the plurality of user location clusters, when the determined user location satisfies one or more predefined distance criteria; determining an anomaly score for the given computer transaction based at least in part on a centroid location of the assigned user location cluster; and updating the centroid location of the assigned user location cluster based on the user location.

These and other illustrative embodiments disclosed herein include; without limitation, methods, apparatus, networks, systems and computer program products comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

The computer networks described herein comprise one or more "information processing systems" that may encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

As will be described, the present disclosure, in one or more illustrative embodiments, provides methods, computer program products and apparatus for adaptive clustering of the location of a given user for multiple transactions as part of a validation of the identity of a user associated with a particular transaction. In one or more exemplary embodiments, a user location for a particular transaction is assigned to one user location cluster of a plurality of user location clusters based on a distance between the user location and centroids of the plurality of user location clusters. An anomaly score is then determined for the particular transaction based on a centroid location of the assigned user location cluster. The centroid location of the assigned user location cluster is updated based on the location of the user for the particular transaction.

Machine Learning (ML) models use a variety of inputs (also called features) to learn and derive their weights in a given problem. For example, a model that was trained to provide assurance to a user identity in web-based authentication (e.g., ensuring that the presented credentials belong to a person who used those credentials to access a cloud service) might use hundreds of input parameters. Creation of accurate features increases the value of the data and significantly improves the overall performance of the ML models.

A common practice is to understand what is common for a user to do where a user lives and what type of device/network he or she uses). Having access to historic and real time data can provide a better understanding of which features can be valuable. By aggregating this data into a view (known as profile) of the normal behavior of the user, deviations from the normal behavior can be detected and a level of assurance in the presented data can be determined. Too many deviations naturally decrease the confidence in the true identity of the user.

Location is an important indicator of the activity of a user (or an entity) activity. Most users have a small number of locations where they typically operate. Hence, the global positioning system (GPS) coordinates collected either from a user mobile phone or with HTML5 (Hyper Text Markup Language 5) are a good source of location data to use. Once obtained, it is often observed that such data has too high of a resolution which causes the GPS data to be very noisy to be used as an input to a machine learning model. A common practice to reduce the resolution of the location is to map such coordinates to the country and city pairs. For example, the following pair of latitude/longitude (lat/lon) 32.16673/ 34.81263 will be mapped to country=Israel, and city=Hertzliya. Such data modifications can reduce the average number of GPS points per user to a mere four country-city pairs.

The problem with such an approach is that by reducing the dimensionality of the data, the accuracy is also reduced. Therefore, it is easier for an adversary to be able to impersonate the user data with a spoofed location. In such a case, it is enough to present any GPS point that corresponds to a typical user country and city location (for example, by looking at a company's website for office location).

One or more embodiments of the disclosure recognize that conventional approaches for representing the location of the user using Country/City pairs does not provide sufficient granularity, and that is often desirable to determine the user with a building granularity (for example, distinguishing an office location of a user from a preferred neary coffee shop of the user). The disclosed techniques for adaptive clustering of the location of a given user for multiple transactions reduces the dimensionality of the data while also maintaining the accuracy of the UPS data (on the order of, for example, tens of meters). Generally, clusters of the location history of the user are created with a moving centroid that is updated, for example, with each new transaction.

Figure 1:
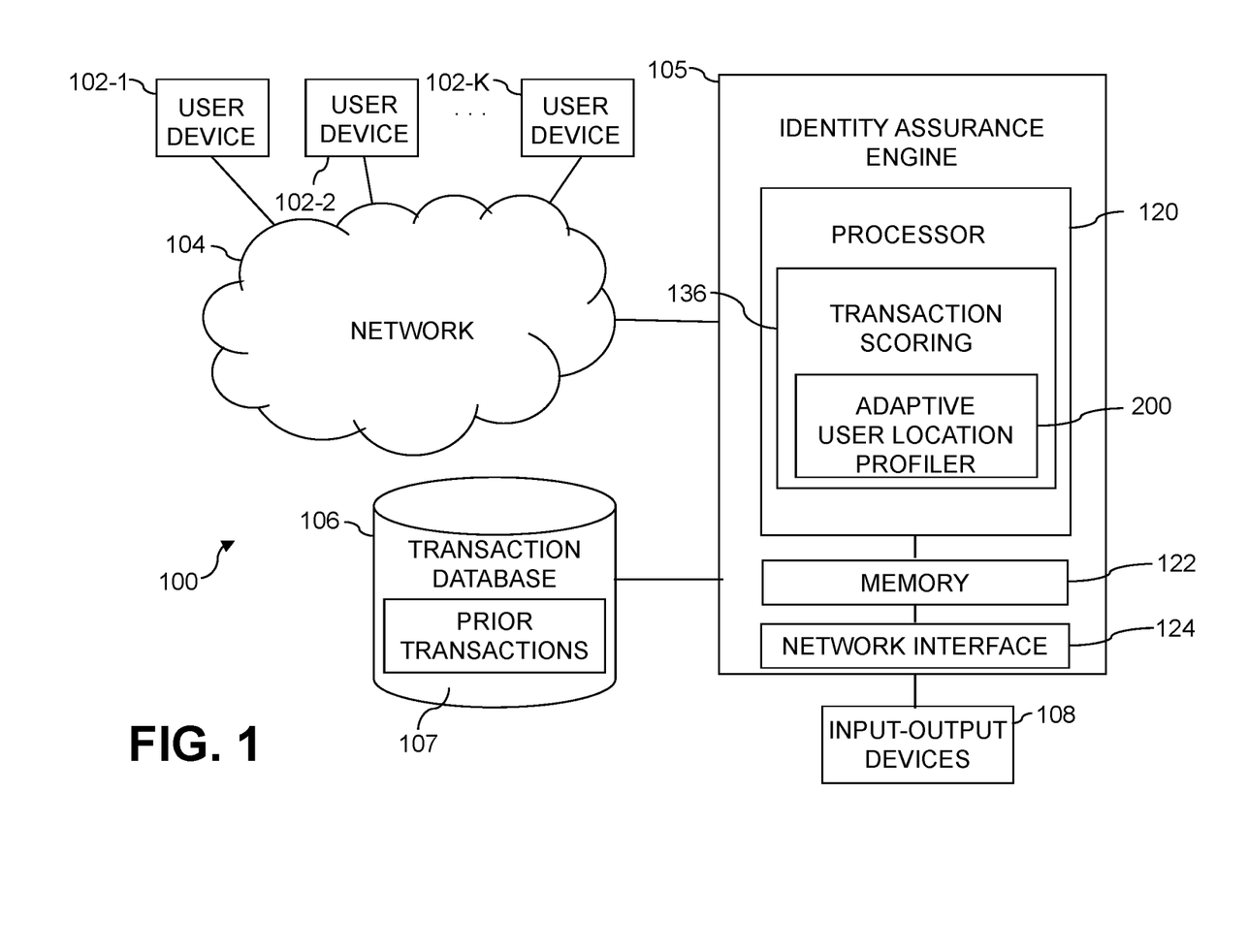
FIG. 1 is a block diagram of a computer network configured for adaptive clustering of the location of a given user, in an illustrative embodiment.

FIG. 1 is a block diagram of a computer network 100 configured for adaptive clustering of the location of a given user, in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

Also coupled to the network 104 is an identity assurance engine 105 of an enterprise organization or another entity that employs identity and access management tools. The identity assurance engine 105 is advantageously configured for evaluating the location of a user using adaptive clustering of the location of a given user, performed by an adaptive user location profiler 200, as discussed further below in conjunction with FIG. 2. The identity assurance engine 105 has an associated transaction database 106 configured to store information relating to prior transactions 107 of the enterprise organization in the computer network 100. Other types of information that can be stored in the transaction database 106 as part of, or in conjunction with, the prior transactions 107 include network sessions data, login data or other types of data characterizing user access to protected resources within the computer network 100, as well as various combinations of multiple distinct types of such data. Network sessions data can include, for example, virtual private network (VPN) session data for VPN connections initiated within the computer network 100. Login data can include, for example, authentication data or other types of login data including timestamps and other information associated with login events. Numerous other types of information can be incorporated into the prior transactions 107 or otherwise stored in the transaction database 106.

The user devices 102 may comprise, for example, mobile telephones, laptop computers, tablet computers, desktop computers or other types of devices capable of communicating over the network 104, in any combination. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network" Numerous other operating scenarios involving a wide variety of different types and arrangements of processing devices and networks are possible, as will be appreciated by those skilled in the art.

In one or more embodiments, a browser of the user devices 102 provides location information associated with a given transaction. For example, the user devices 102 can provide the location information in a lat/lon format, using, e.g., JavaScript or HTML5. In further variations, the location information can be provided using a position in a known two-dimensional or three-dimensional space.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Also associated with the identity assurance engine 105 are input-output devices 108, which illustratively comprise keyboards, displays or other types of input-output devices in any combination. Such input-output devices are used to support one or more user interfaces to the identity assurance engine 105, as well as to support communication between the identity assurance engine 105 and other related systems and devices not explicitly shown.

In one or more embodiments, login events initiated at respective ones of the user devices 102 are directed to the identity assurance engine 105 over the network 104 for processing. The identity assurance engine 105 determines an anomaly score for a given access attempt based on an assignment of a location of the user device 102 associated with the given access attempt to one of a plurality of user location clusters of the user. Upon evaluation of the determined location information, the identity assurance engine 105 grants the requesting user device 102 access to one or more protected resources of the computer network 100. The identity assurance engine 105 in one or more embodiments can be implemented as a stand-alone server, set of servers or other type of identity and access management system coupled to the network 104.

The identity assurance engine 105 in the FIG. 1 embodiment is assumed to be implemented using at least one processing device. Each such processing device generally comprises at least one processor and an associated memory, and implements one or more functional modules for controlling certain features of the identity assurance engine 105.

More particularly, the identity assurance engine 105 in this embodiment comprises a processor 120 coupled to a memory 122 and a network interface 124.

The transaction database 106 in the present embodiment is illustratively implemented as part of one or more storage systems coupled to or otherwise associated with the identity assurance engine 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Other examples of particular types of storage that can be used in implementing a given storage system in an illustrative embodiment include storage arrays, flash storage, cloud storage, object-based storage, and scale-out NAS clusters. Combinations of multiple ones of these and other storage types can also be used in implementing a given storage system in an illustrative embodiment.

Although shown as being arranged externally to the identity assurance engine 105, the transaction database 106 in some embodiments can be at least in part internal to the identity assurance engine 105. For example, at least portions of the transaction database 106 can be implemented as an in-memory database utilizing the memory 122.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the identity assurance engine 105 to communicate over the network 104 with the user devices 102, and illustratively comprises one or more conventional transceivers.

Figure 2:
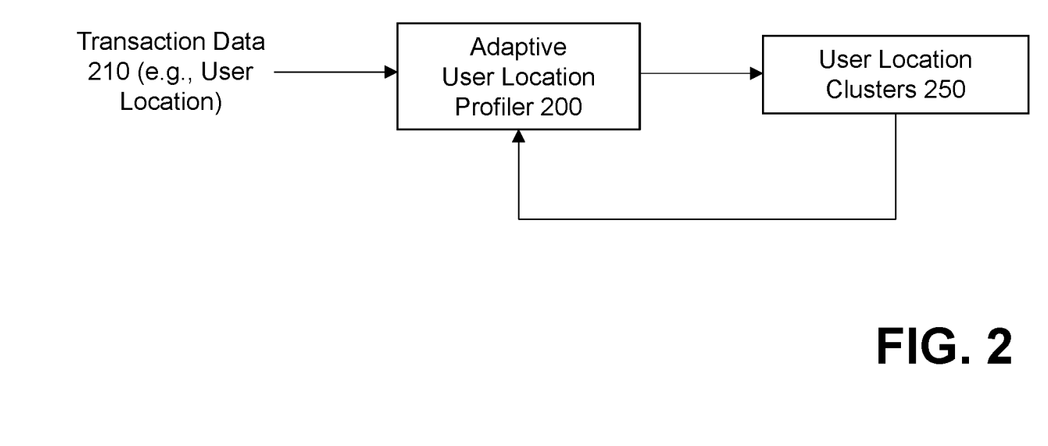
FIG. 2 illustrates the adaptive user location profiler of FIG. 1, in further detail, according to one embodiment of the disclosure.

One or more of the transaction scoring module 136 and the adaptive user location profiler 200, or portions thereof, can be implemented using the functions of the RSA SecurID® Suite for identity and access management, commercially available from RSA Security and Dell of Hopkinton, Mass.

The arrangement described above advantageously permits the identity assurance engine 105 to adaptively cluster the location of a given user over multiple transactions and to perform identity validation for a given transaction based on the determined location of the user for the given transaction.

At least portions of the transaction scoring module 136 and/or the adaptive user location profiler 200 may be implemented at least in part in the form of software that is stored in memory 122 and executed by processor 120. Similarly, at least portions of the identity assurance engine 105 can be implemented at least in part in the form of software that is stored in memory 122 and executed by processor 120.

It should also be understood that the particular set of elements shown in FIG. 1 for adaptive clustering of the location of a given user for multiple transactions and validating the identity of a user is presented by way of illustrative example only, and in other embodiments additional or alternative elements may be used. Thus, another embodiment may include additional or alternative systems, devices and other network entities, as well as different arrangements of modules and other components.

By way of example, in other embodiments, one or more components of the identity assurance engine 105, such as transaction scoring module 136 and/or the adaptive user location profiler 200, can be implemented elsewhere in the computer network 100.

In some embodiments, the identity assurance engine 105 is a part of or otherwise associated with another system, such as, for example; a security operations center (SOC) or a critical incident response center (CIRC).

Additionally, or alternatively, the identity assurance engine 105 can be a part of, or incorporate, an otherwise conventional security analytics system, such as the RSA Security Analytics system commercially available from RSA, The Security Division of Dell EMC Corporation of Hopkinton, Mass.

Other embodiments can implement the identity assurance engine 105 as part of or in conjunction with a security information and event management (SIEM) system; such as the enVision® platform, also commercially available from RSA. Such a REM system is also considered another possible example of a network security system as that term is broadly used herein. In an embodiment of this type, at least portions of the prior transactions 107 stored in the transaction database 106 may comprise additional information derived from security logs collected by the STEM system.

FIG. 2 illustrates the adaptive user location profiler 200 of FIG. 1, in further detail, according to one embodiment of the disclosure. The exemplary adaptive user location profiler 200 may be embodied as any kind of computing device, such as, for example, a personal computer, a workstation, a server, an enterprise server, a laptop computer, a mobile computer, a smart phone, and a tablet computer.

As shown in FIG. 2, the exemplary adaptive user location profiler 200 processes transaction data 210 that comprises, for example, user location information for one or more transactions. As discussed further below in conjunction with FIGS. 3 and 4, the exemplary adaptive user location profiler 200 implements an exemplary adaptive user location profiling process 300 that assigns transactions to an existing user location cluster 250 or creates a new user location cluster 250, if needed. A plurality of user location clusters 250 are obtained comprising the transaction attempts of a particular user. The user location clusters 250 can be used, for example, to validate the identity of the corresponding user for transaction attempts made with the alleged identity of the user. The centroid location of user location cluster that a particular transaction is assigned to is updated in an adaptive manner, based on the user location for the particular transaction.

Figure 3:
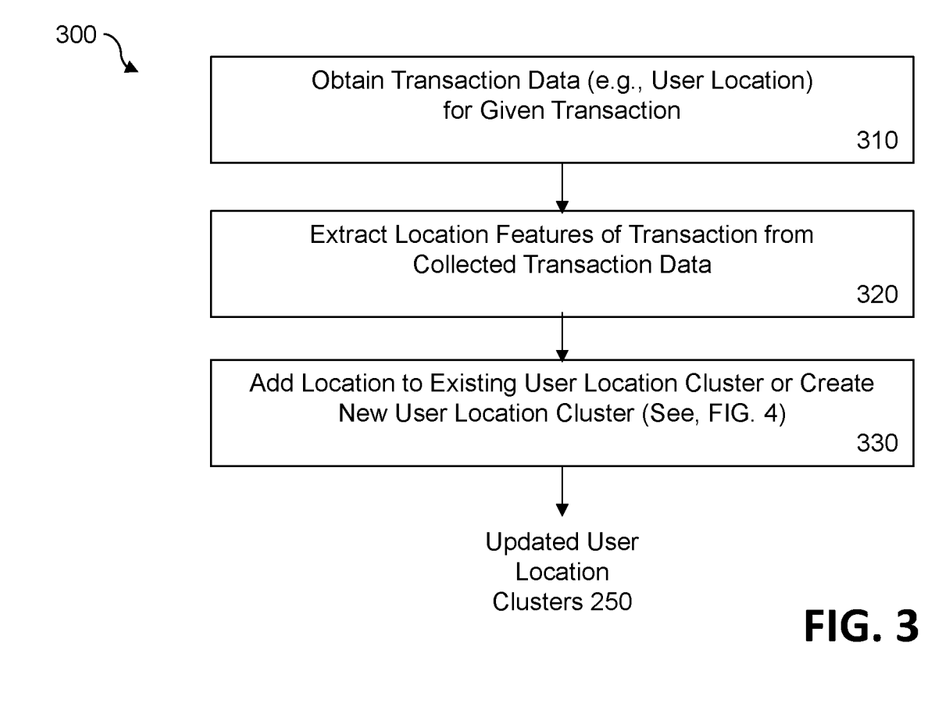
FIG. 3 is a flow chart illustrating an exemplary implementation of an adaptive user location profiling process, according to an embodiment of the disclosure.

FIG. 3 is a flow chart illustrating an exemplary implementation of an adaptive user location profiling process 300, according to an embodiment of the disclosure. As shown in FIG. 3, the exemplary adaptive user location profiling process 300 initially obtains transaction data that comprises, for example, user location information for a given transaction in step 310.

The adaptive user location profiling process 300 then extracts locations features of the given transaction from the collected transaction data during step 320. During step 330, the exemplary adaptive user location profiling process 300 employs an exemplary clustering routine 400, as discussed further below in conjunction with FIG. 4, to add the location of the given transaction to an existing user location cluster 250 or to create a new user location cluster 250. In this manner, the adaptive user location profiling process 300 determines an appropriate user location cluster 250 for the given transaction.

Figure 4:
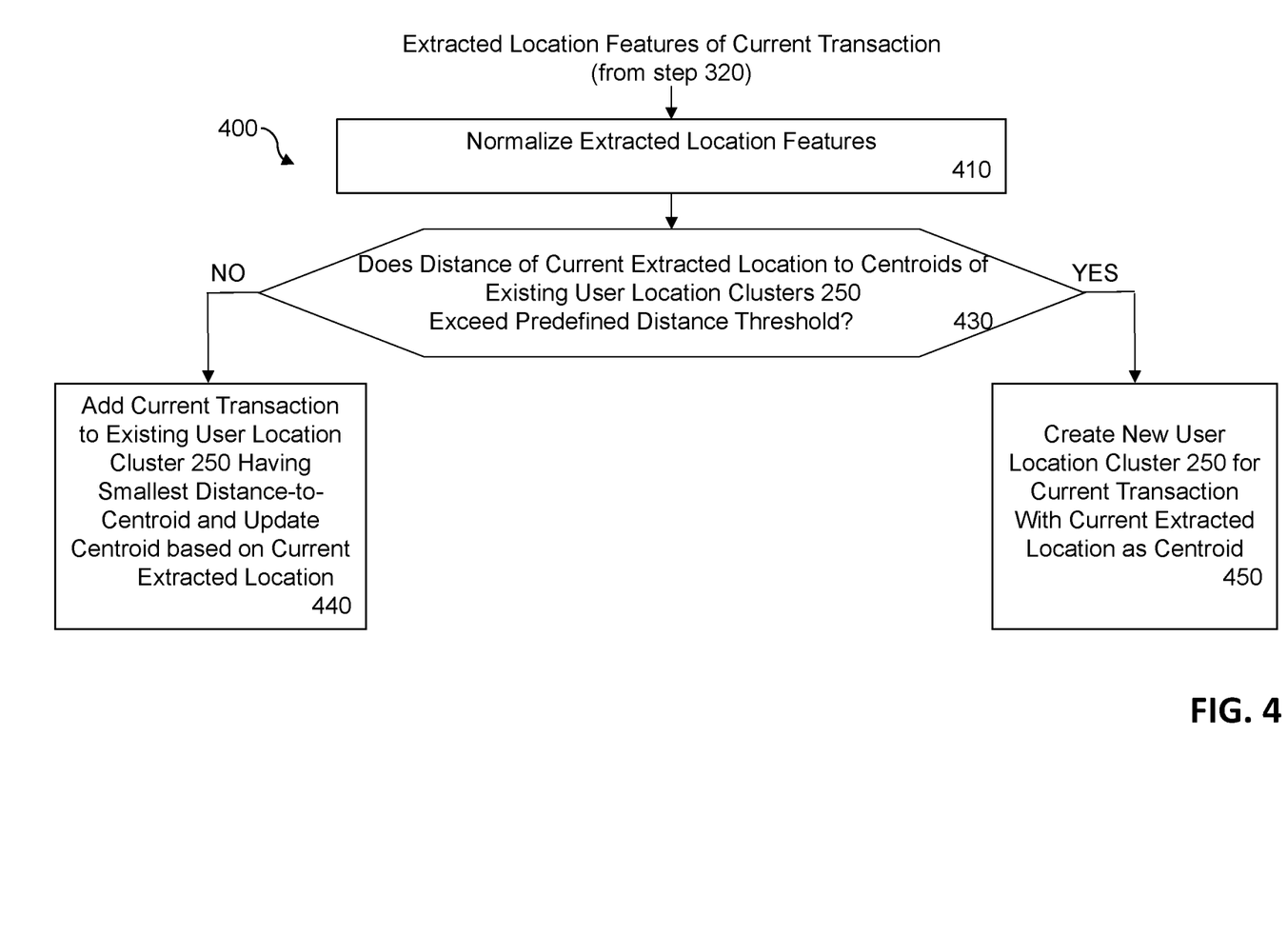
FIG. 4 is a flow chart illustrating an exemplary implementation of the clustering routine performed during the processing of FIG. 3, according to one embodiment of the disclosure.

FIG. 4 is a flow chart illustrating an exemplary implementation of the clustering routine 400 performed during the processing of FIG. 3, according to one embodiment of the disclosure. As shown in FIG. 4, the exemplary clustering routine 400 initially obtains the extracted location features of the current transaction (from step 320). Extracted location features are normalized during step 410.

A test is performed during step 430 to determine if the distance of the current extracted location to the centroids of the existing user location clusters 250 exceeds a predefined distance threshold (for example, in one or more embodiments, 500 meters may be a suitable predefined distance threshold). If it is determined during step 430 that the distance of the current extracted location to the centroids of the existing user location clusters 250 does not exceed the predefined distance threshold, then the current transaction is added to the existing user location cluster 250 having the smallest distance-to-centroid value during step 440. The centroid of the assigned user location cluster 250 is also updated during step 440 based on the extracted location for the current transaction.

If, however, it is determined during step 420 that the distance of the current extracted location to the centroids of the existing user location clusters 250 does exceed the predefined distance threshold, then a new user location cluster 250 is created for current transaction with the current extracted location as its centroid during step 450.

Figure 5:
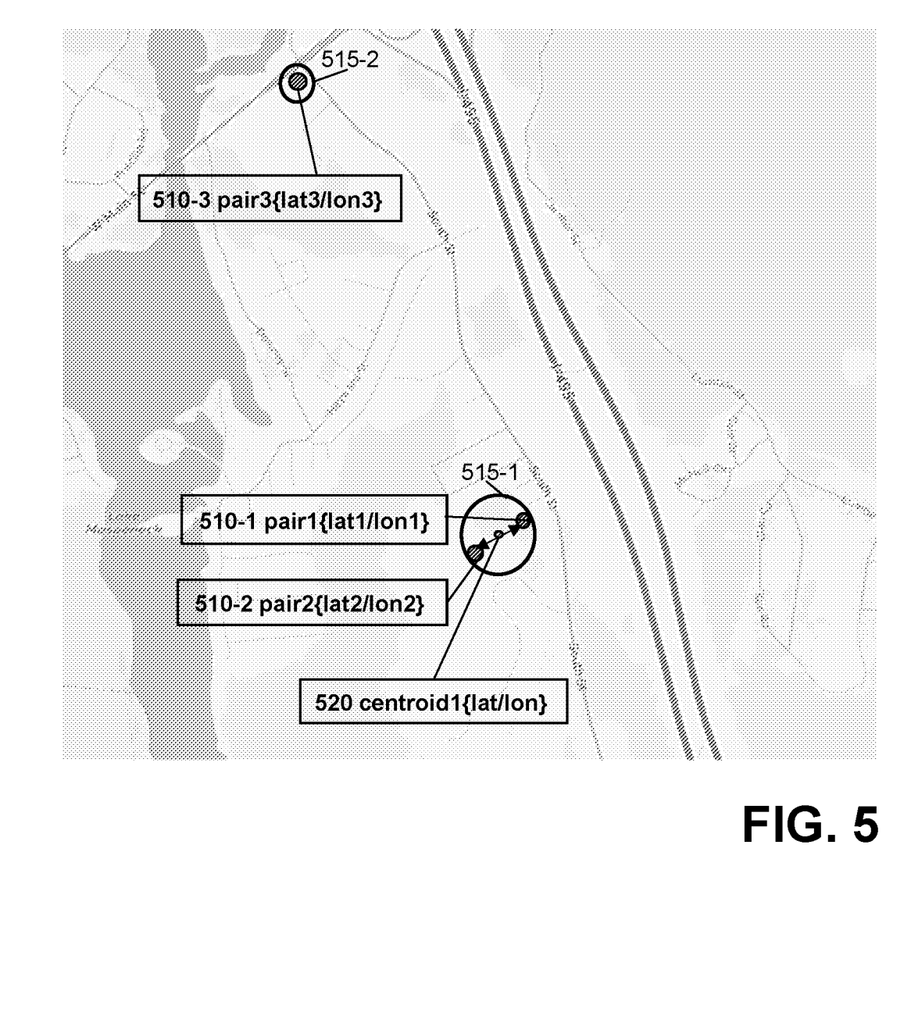
FIG. 5 illustrates different locations of a given user that are processed in various embodiments of the disclosure.

FIG. 5 illustrates different locations 510-1 through 510-3 of a given user on an exemplary map 500 that are processed in various embodiments of the disclosure. As shown in FIG. 5, the exemplary locations 510-1 through 510-3 are each represented as latitude/longitude pairs. Assume that the exemplary locations 510-1 through 510-3 are recorded sequentially with location 510-1 being the first recorded location for a given user. When the first location 510-1 is recorded, with a location of (lat1/lon1), a new user location cluster 515-1 is created having a centroid equal to the first location 510-1, expressed as lat1/lon1) (although user location cluster 515-1 is shown with a larger centroid in FIG. 5).

Thereafter, the second location 510-2 is recorded, with a location of (lat2/lon2), and the second location 510-2 is within the predefined distance threshold to the centroid of existing user location cluster 515-1. Now, the distance between the the second location 510-2 and the centroids of all available clusters are evaluated and the cluster with the smallest distance that is also smaller than a specified maximum radius (maxDistance; e.g., 500 meters) is selected. Thus, in the example of FIG. 5, the second location 510-2 is added to the existing user location cluster 515-1 and the centroid location 520 (expressed, for example, as a latitude/longitude pair) of the existing user location cluster 515-1 is updated to reflect the addition of the the second location 510-2, as discussed further below in conjunction with FIG. 6.

At a later time, the third location 510-3 is recorded. Assume that the third location 510-3 is not within the predefined distance threshold to the centroid of existing user location cluster 515-1 (or any other existing user location cluster 515). Thus, a new user location cluster 515-2 is created for the third location 510-3 and having a centroid equal to the third location 510-3.

Figure 6:
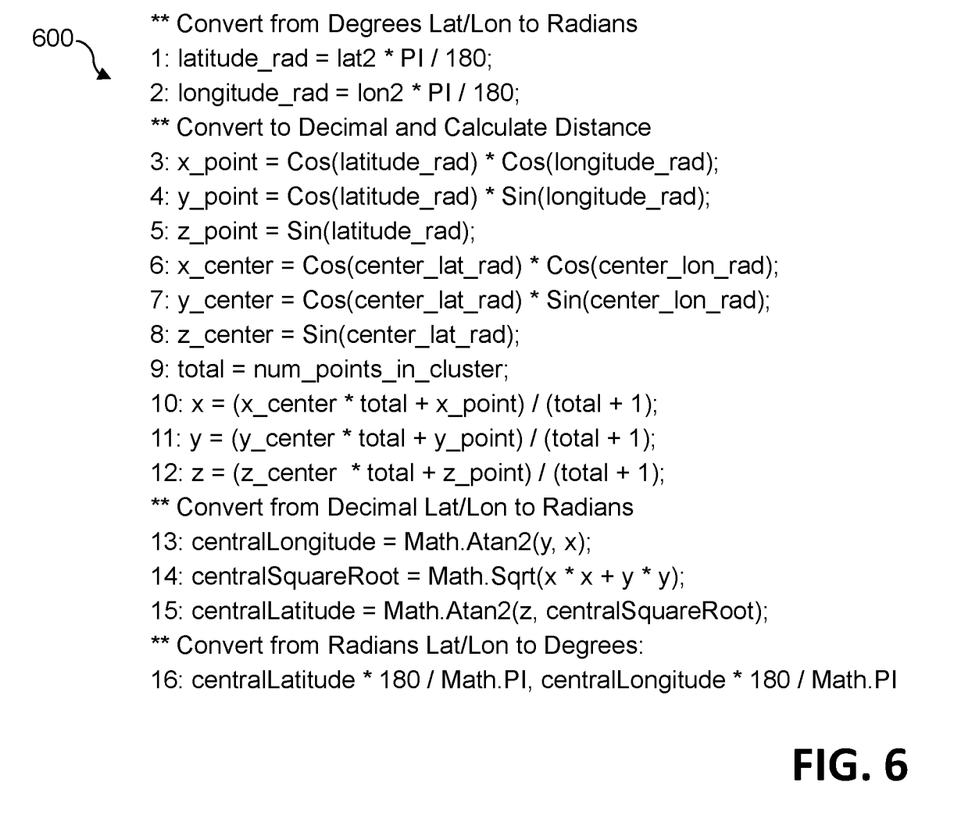
FIG. 6 illustrates exemplary pseudo code for a cluster centroid location updating process, according to one embodiment of the disclosure.

FIG. 6 illustrates exemplary pseudo code for a cluster centroid location updating process 600, according to one embodiment of the disclosure. In one or more embodiments, the cluster centroid can gradually drift from the first recorded point (e.g., lat1/lon1 for first point). For example, the drift can be limited by checking that the current cluster center as the centroid for a cluser has distance from the first point that is less than the specified maximum radius. When the new point shifts the current cluster center to a distance that is larger than the specified maximum radius from the first point, then the new point will be added to a new duster, in one or more embodiments. A specified minimum rectangle that contains all of the cluster points represents the maximum and minimum lat/lon of the duster.

Generally, the exemplary cluster centroid location updating process 600 calculates a center point of multiple latitude/longitude coordinate pairs in a given user location cluser. The exemplary cluster centroid location updating process 600 employs a variable, num_points_in_cluster, indicating the number of points currently in a given cluster (and PI indicates it). The latitude and longitude values are intially translated to radians in lines 1 and 2.

Thereafter, the exemplary cluster centroid location updating process 600 determines the user location in a three-dimensional space, during lines 3-5. The centroid of the cluster is determined in lines 6-8, and the total number of points in the cluster is obtained in line 9. The total number of points in the cluster is used during lines 10-12 to compute a weighted average with respect to the shift in the location of the centroid.

The radian values are translated back to latitude and longitude values in lines 13-15, and finally the latitude and longitude values are translated to a decimal format in line 16. In one or more embodiments, an implementation can start with a fixed parameter for the maximum radius of the cluster (maxDistance), Over time, however, after the system becomes more mature, the third interquartile range (IQR) of the observed area of the the minimum rectangle that contains all cluster points can be periodically calculated (e.g., on a weekly basis or another configurable amount of time). The maximum radius of the cluster (maxDistance) can gradually be reduced over time. In this manner, a gradual adaptation of the cluster size to the observed behavior is provided.

For example, assume that after a month that the cluster centroid location updating process 600 was employed for a given customer implementation, 75% of the clusters have a minimum rectangle value of 0.03 squared km. A new maximum radius of the cluster can then be calculated by assuming that the area of the circle with new maximum radius of the cluster as a radius is equal to 0.03; hence, the new maximum radius of the cluster is 0.097 km or 97 m (which is smaller than the initial default value of 500 m).

For fine tuning the clusters and in order to overcome the potential cluster drift, a periodic cleanup is optionally performed (for example, on a periodic basis, such as a weekly basis), to re-index near cluster identifiers. The re-indexing of near cluster identifiers can be performed when the area covered by two clusters overlaps by more than 75%, and the two clusters should be merged to one new cluster identifier. Generally, when clusters are created as the events arrive, there is a possibility that non-optimal clusters can be created. Thus, a periodic cleaning process that evaluates the clusters using, for example, a batch/bulk data can help resolve some of these issues and "clean up" the clusters.

In one or more alternative embodiments, a gradual convergence to the right number of clusters with minimal size and overlap is accomplished. The gradual approach is desirable in some implementations, since the gradual approach allows some benefit to be gained from the cluster before the cluster may be fully stabilized, but it introduces challenges dealing with clusters that may overlap as they mature. This clustering can optionally be done in batches as well; by waiting until some number of locations have been observed and then performing standard clustering to identify clusters of locations. This could be repeated on a time or event basis to capture changes in behavior or locations that were not present in the original clustering, or could be done only once with anything falling outside of those clusters being put in a shared "other" cluster, There is also a hybrid approach which would perform gradual clustering with periodic cleaning based on a point-in-time clustering (streaming clustering cleaned by batch clustering).

CONCLUSION

The above-described illustrative embodiments provide significant advantages relative to conventional approaches. Among other benefits, one or more embodiments of the disclosed techniques for user location clustering help to reduce the resolution of noisy GPS data to a manageable, but sufficiently informative, level. In addition, the disclosed user location clustering techniques also allow the accuracy of the original data to be retained, and the tracking of each user precise location, using the cluster identifier as an input to an ELBA model as an accurate feature that is hard to spoof.

It is to be appreciated that the foregoing advantages are illustrative of advantages provided in certain embodiments, and need not be present in other embodiments.

The computer networks disclosed herein are illustratively implemented using one or more processing platforms, examples of which will be now be described in greater detail. A given such processing platform comprises at least one processing device comprising a processor coupled to a memory.

In some embodiments, portions of a computer network as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker containers or other types of Linux containers (LXCs).

The cloud infrastructure may additionally or alternatively comprise other types of virtualization infrastructure such as virtual machines implemented using a hypervisor. An example of a commercially available hypervisor platform that may be used to implement portions of the computer network 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements. The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another processing platform example, portions of a given processing platform in some embodiments can comprise converged infrastructure such as VxRail™ VxRack™ or Vblock® converged infrastructure commercially available from VCE, the Virtual Computing Environment Company, an EMC Federation Company.

The particular processing platforms described above are presented by way of example only, and a given computer network such as computer network 100 may include additional or alternative processing platforms, as well as numerous distinct processing platforms in any combination, with each such platform comprising one or more computers, servers, storage devices or other processing devices.

Processing devices and other computer network components can communicate with one another using a variety of different communication protocols and associated communication media.

It should again be emphasized that the above-described embodiments of the invention are presented for purposes of illustration only. Many variations may be made in the particular arrangements shown. For example, although described in the context of particular network and device configurations, the user location clustering techniques are applicable to a wide variety of other types of computer networks and processing device configurations. Also, different types and arrangements of network security systems, modules, features, risk scores, and other components and parameters can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
obtaining transaction data for a given computer transaction by a user;
extracting one or more location features from said transaction data for said given computer transaction;
determining a user location of said given computer transaction based on said one or more location features;
assigning, using at least one processing device, said given computer transaction to one user location cluster of a plurality of user location clusters of said user based on a distance between said user location and centroids of each of said plurality of user location clusters, when said determined user location satisfies one or more predefined distance criteria, wherein said plurality of user location clusters comprises computer transactions by said user;
determining, using said at least one processing device, an anomaly score for said given computer transaction based at least in part on a centroid location of said assigned user location cluster; and
updating said centroid location of said assigned user location cluster based on said user location.

2. The method of claim 1, wherein said one or more predefined distance criteria comprise a specified threshold distance between said user location and said centroids of said plurality of user location clusters.

3. The method of claim 1, further comprising the step of creating a new user location cluster for said given computer transaction if said distance between said user location and said centroids of said plurality of user location clusters does not satisfy said one or more predefined distance criteria.

4. The method of claim 3, wherein the centroid for the new user location cluster is based on the user location for said given computer transaction.

5. The method of claim 1, further comprising the step of performing one or more of authenticating said user and verifying an identity of said user based at least in part on said anomaly score.

6. The method of claim 1, wherein said transaction data is processed for plurality of streamed given computer transactions in real-time.

7. The method of claim 1, wherein said plurality of user location clusters of said user are part of a model of an expected behavior of said user.

8. The method of claim 1, further comprising the step of translating said user location into a different location format.

9. The method of claim 1, further comprising the step of adapting a size of said predefined distance criteria based on observed behavior of said user.

10. The method of claim 1, further comprising the step of refining one or more clusters based on a batch analysis to overcome one or more limitations imposed by an incremental clustering.

11. A computer program product, comprising a tangible non-transitory machine-readable storage medium having encoded therein executable code of one or more software programs, wherein the one or more software programs when executed by at least one processing device perform the following steps:
obtaining transaction data for a given computer transaction by a user;
extracting one or more location features from said transaction data for said given computer transaction;
determining a user location of said given computer transaction based on said one or more location features;
assigning said given computer transaction to one user location cluster of a plurality of user location clusters of said user based on a distance between said user location and centroids of each of said plurality of user location clusters, when said determined user location satisfies one or more predefined distance criteria, wherein said plurality of user location clusters comprises computer transactions by said user;
determining, using said at least one processing device, an anomaly score for said given computer transaction based at least in part on a centroid location of said assigned user location cluster; and
updating said centroid location of said assigned user location cluster based on said user location.

12. The computer program product of claim 11, wherein said one or more predefined distance criteria comprise a specified threshold distance between said user location and said centroids of said plurality of user location clusters.

13. The computer program product of claim 11, further comprising the step of creating a new user location cluster for said given computer transaction if said distance between said user location and said centroids of said plurality of user location clusters does not satisfy said one or more predefined distance criteria.

14. The computer program product of claim 11, further comprising the step of performing one or more of authenticating said user and verifying an identity of said user based at least in part on said anomaly score.

15. The computer program product of claim 11, further comprising the step of adapting a size of said predefined distance criteria based on observed behavior of said user.

16. An apparatus, comprising:
a memory; and
at least one processing device, coupled to the memory, operative to implement the following steps:
obtaining transaction data for a given computer transaction by a user;
extracting one or more location features from said transaction data for said given computer transaction;
determining a user location of said given computer transaction based on said one or more location features;
assigning said given computer transaction to one user location cluster of a plurality of user location clusters of said user based on a distance between said user location and centroids of each of said plurality of user location clusters, when said determined user location satisfies one or more predefined distance criteria, wherein said plurality of user location clusters comprises computer transactions by said user;
determining, using said at least one processing device, an anomaly score for said given computer transaction based at least in part on a centroid location of said assigned user location cluster; and
updating said centroid location of said assigned user location cluster based on said user location.

17. The apparatus of claim 16, wherein said one or more predefined distance criteria comprise a specified threshold distance between said user location and said centroids of said plurality of user location clusters.

18. The apparatus of claim 16, further comprising the step of creating a new user location cluster for said given computer transaction if said distance between said user location and said centroids of said plurality of user location clusters does not satisfy said one or more predefined distance criteria.

19. The apparatus of claim 16, further comprising the step of performing one or more of authenticating said user and verifying an identity of said user based at least in part on said anomaly score.

20. The apparatus of claim 16, further comprising the step of adapting a size of said predefined distance criteria based on observed behavior of said user.

* * * * *